R. JOYCE.
GAS HEATED IRON.
APPLICATION FILED JAN. 21, 1914.
1,107,526.
Patented Aug. 18, 1914.
2 SHEETS—SHEET 1.
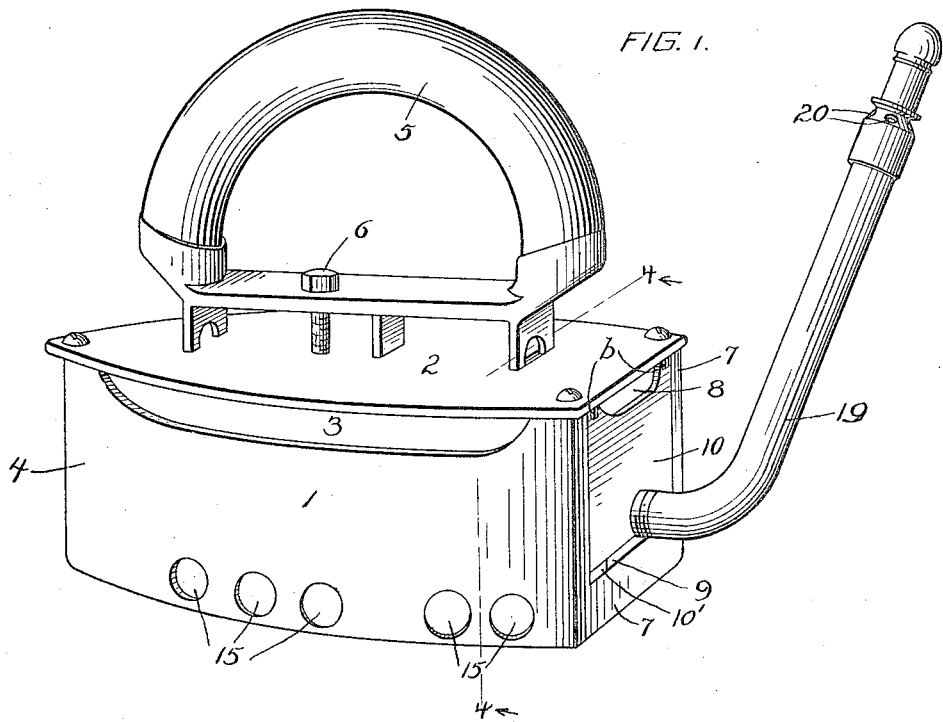
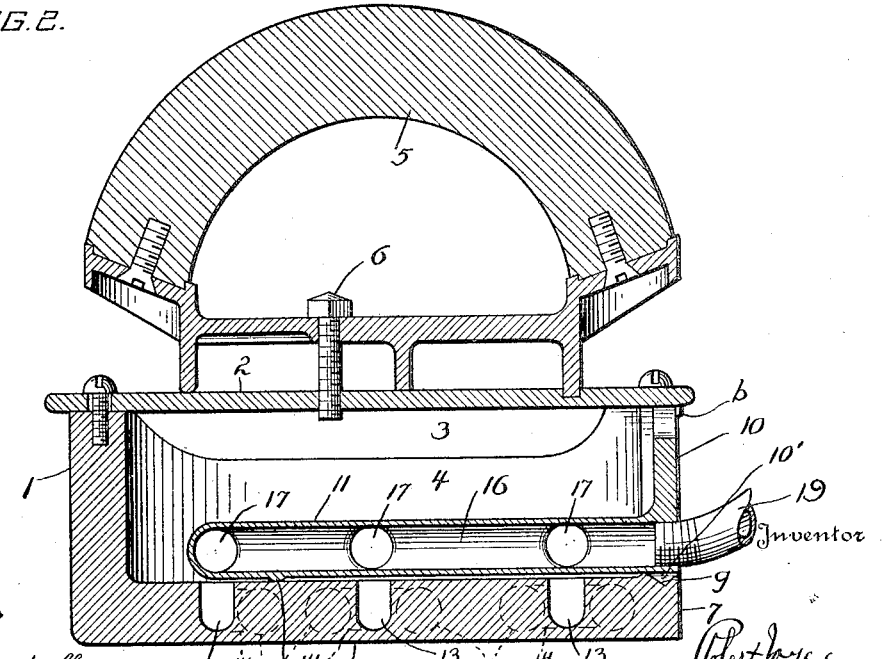

R. JOYCE.
GAS HEATED IRON.
APPLICATION FILED JAN. 21, 1914.
1,107,526.
Patented Aug. 18, 1914.
2 SHEETS—SHEET 2.
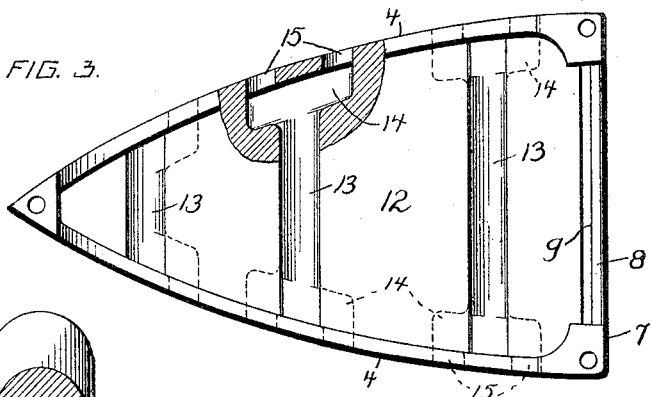
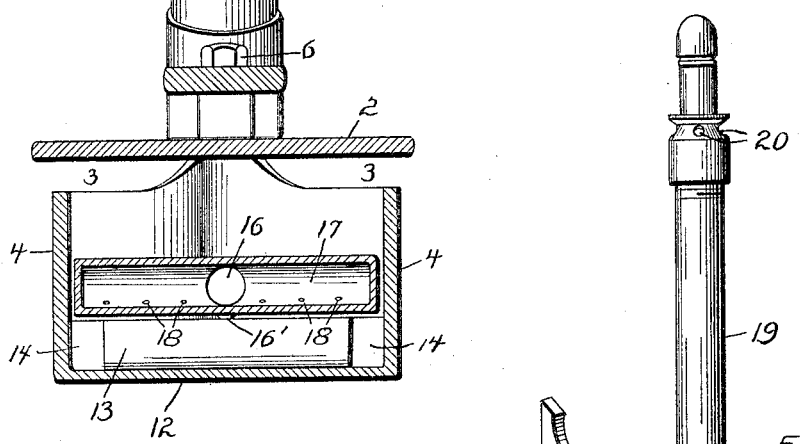
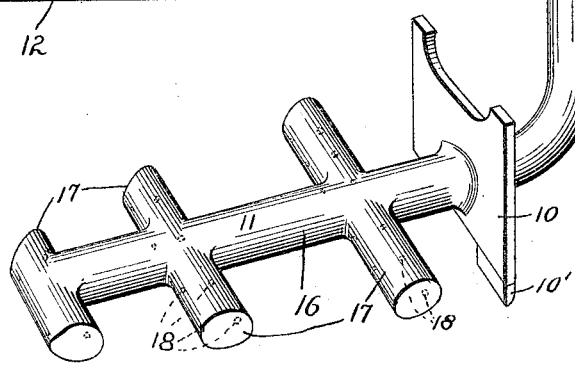
Witnesses
A. L. Gersdorff.
M. J. Finley
Inventor
Robert Joyce
By Robert H. Young,
Attorney

UNITED STATES PATENT OFFICE.

ROBERT JOYCE, OF PHILADELPHIA, PENNSYLVANIA.

GAS-HEATED IRON.

1,107,526. Specification of Letters Patent. Patented Aug. 18, 1914.

Application filed January 21, 1914. Serial No. 813,556.

*To all whom it may concern:*

Be it known that I, ROBERT JOYCE, a subject of the King of England, and a resident of Philadelphia, in the county of Philadelphia and State of Pennsylvania, have invented new and useful Improvements in Gas-Heated Irons, of which the following is a specification.

My invention relates to sad irons, and pertains more particularly to gas-heated irons.

The object of my invention is to produce a gas-heated iron in which an intense heat is projected on the base of the iron body and wherein is attained a more even and complete distribution of heat over the entire surface of the base.

A further object thereof is to attain a complete combustion of gas within the heating chamber by providing a plurality of air channels in the base of the iron communicating with orifices in the side walls of the iron adapted to conduct an adequate air supply to the burner orifices of the burner.

Another object of my invention is to produce a burner adapted to distribute the flame more completely over the face of the base of the iron body comprising a longitudinal gas supply pipe having one or more lateral branches registering with the transverse air channels and provided with a plurality of radially disposed gas-burner orifices arranged to discharge a flame on the base of the iron body on each side of the air-inlet-channels, whereby is attained a higher degree of oxygenization of the flame and a direct intense heat on the base of the iron.

A further object of my invention is to produce a removable burner for a gas-heated iron comprising a longitudinal gas supply pipe having a plurality of lateral branches arranged to register with the transverse air channels in the base of the iron, said branches being provided with a plurality of rows of radially disposed gas burner orifices arranged parallel with the air channels on each side thereof, whereby the flame is fed with air from beneath but discharged upon the base of the iron on each side of the air channels.

Another object of my invention is to provide a longitudinally disposed channel at each end of each transverse air inlet channel connecting the transverse channels with the air inlet orifices in the sides of the iron, whereby said orifices are offset from the ends of the transverse channels to prevent the escape of flame through the orifices during the movement of the iron in use, and a still further object of my invention is to produce a more simple, cheap, and efficient gas-heated iron than has heretofore been attained.

To these ends my invention includes the combination and arrangement of component parts to be hereinafter described and more particularly pointed out in the claims.

In the accompanying drawings in which like reference characters indicate similar parts, Figure 1 is a perspective view of a sad-iron of my invention; Fig. 2 is a longitudinal sectional view of the same; Fig. 3 is a plan view thereof with the cover and burner removed, a part of the base being broken away; Fig. 4 is a transverse sectional view taken on the line 4—4 of Fig. 1, and Fig. 5 is a perspective view of my burner removed from the iron body.

Referring now to the drawings, 1 indicates a hollow iron body of conventional shape, having a removable cover 2 screwed or otherwise suitably fastened thereon, and provided with a longitudinal slot or cut-out portion 3 in the top of each of its longitudinal side walls 4, to allow the escape of the products of combustion. A convenient handle 5 is suitably secured upon the cover or lid 2 as by a screw or bolt 6. The rear wall 7 has an opening therein at 8 to receive the rear wall plate 10 on which the burner 11, hereinafter described, is carried and for the purpose of securing the lower edge of the plate in position, the base of the iron throughout the width of the opening is grooved at $g$ to receive the lower edge of the plate.

The bottom or base 12 of my iron is provided with a plurality of transverse grooves or channels 13 in its upper or inner face, each end of each of which connects with a longitudinal bore 14 at the ends of which said bores communicate with the air ports 15 in the side walls of the iron body.

The burner of my invention is carried on the wall plate 10, heretofore mentioned, secured in the opening in the rear wall of the iron body, and comprises the longitudinal gas supply pipe 16, having one or more lateral branches 17 corresponding to and registering with the transverse channels 13 in the base of the iron body.

In the embodiment of my invention illustrated, I have provided three transverse grooves and three lateral burner branches. The lateral branches are provided with two rows of radially disposed gas-orifices 18 which discharge on the base of the iron on each side of the channels, and it will be apparent that a liberal and adequate quantity of air is supplied through said channels for intense combustion, when it is appreciated that the air is conducted less than one-half the width of the iron to the farthermost gas orifice. It will also be noted that the wall plate 10 is raised slightly from the base of the iron on the lugs 10' and the burner is held above the base on the lug 16' to permit ample air space beneath the burner for full combustion. The wall plate 10, as shown is cut away at its upper edge adjacent to the cover to form a vent, and is held in position to prevent rocking, when in use, by the lugs b on the rear edge of the cover. The longitudinal gas-supply pipe 16 is connected through the wall plate 10 with the feed tube 19, threaded into the plate, and which, as shown, is deflected to one side to avoid interfering with the action of the operator. Said feed tube is provided with a suitable air inlet 20, and a nipple for attachment to a flexible tube connected with a gas supply.

The construction and operation of my invention will be readily understood from the foregoing description and by reference to the accompanying drawings, and it will be appreciated that the parts and combinations thereof may be varied within the scope of the claims without departing from the spirit and scope of the invention.

Having thus described my invention, what I claim as new and desire to be secured by Letters Patent, is—
1. In a device of the character described, a hollow body having exhaust vents in the walls thereof, a plurality of transverse channels in the base communicating with ports in the side walls, and a gas-burner having branches corresponding to said channels carried in said iron body.

2. In a device of the character described, a hollow body having vents in the walls thereof, a plurality of air-conducting channels in the base, ports in the side walls, said ports being offset from the ends of said channels, a bore connecting said channels with said ports, and a gas-burner having branches registering with said channels carried in said iron body.

3. In a device of the character described, a hollow body having exhaust vents in its walls, a plurality of transverse air-conducting channels in the base communicating with ports in the walls, a gas-burner carried in the hollow body comprising a gas-supply pipe and lateral branches carried over the air channels, having orifices on each side of the channels adapted to discharge on the base of the iron body.

4. In a device of the character described, a hollow body having exhaust vents in its walls, a plurality of transverse air-conducting channels in the base, ports in the side walls, said ports being offset from the ends of said channels, a bore connecting said channels with said ports, a gas-burner carried in said hollow body comprising a plate secured in the rear wall of the hollow body, a longitudinal gas-supply pipe carried thereon, lateral branches registering with said channels having radially arranged burner orifices therein, and a cover and handle for said iron body, substantially as described.

ROBERT JOYCE.

Witnesses:
ERNEST W. NOWACK,
T. J. RIXON.

---

Copies of this patent may be obtained for five cents each, by addressing the "Commissioner of Patents, Washington, D. C."